United States Patent [19]
Werner

[11] Patent Number: 5,960,432
[45] Date of Patent: Sep. 28, 1999

[54] MULTI-LEVEL CAPTIONING FOR ENHANCED DATA DISPLAY

[75] Inventor: Raymond J. Werner, Beaverton, Oreg.

[73] Assignee: Intel Corporation, Santa Clara, Calif.

[21] Appl. No.: 08/775,810

[22] Filed: Dec. 31, 1996

[51] Int. Cl.⁶ .................................................. G06F 17/30
[52] U.S. Cl. ................. 707/10; 395/200.33; 395/200.75
[58] Field of Search ........................ 707/1–10, 100–104, 707/200–206; 395/200.36, 200.56, 200.61, 200.73, 500; 340/825.331; 370/389, 466; 379/88, 196

[56] References Cited

U.S. PATENT DOCUMENTS

| | | | |
|---|---|---|---|
| 4,893,307 | 1/1990 | McKay et al. | 370/389 |
| 5,021,949 | 6/1991 | Morten et al. | 395/200.61 |
| 5,247,651 | 9/1993 | Clarisse | 395/500 |
| 5,552,776 | 9/1996 | Wade et al. | 340/825.31 |
| 5,680,551 | 10/1997 | Martino, II | 395/200.56 |
| 5,771,379 | 6/1998 | Gore, Jr. | 707/101 |

*Primary Examiner*—Ruay Lian Ho
*Attorney, Agent, or Firm*—Blakely, Sokoloff, Taylor & Zafman

[57] ABSTRACT

A method for enhancing the presentation of data received by a client computer from a server computer. Data blocks characterized by varying levels of complexity or appropriateness for particular audiences, that are associated with a base data set, are selected for transmission to a client requesting the base data set, for subsequent presentation to a user along with presentation of the base data set. Selection of an associated data block is based on a specific level established by the client and communicated to the server. Options are provided for the client to establish levels by such means as login IDs, express selection, usage profiling, and visual imaging. In alternative embodiments, a range of levels may be specified, or a rule set for taking action when associated data is present but does not match the level specification.

14 Claims, 6 Drawing Sheets

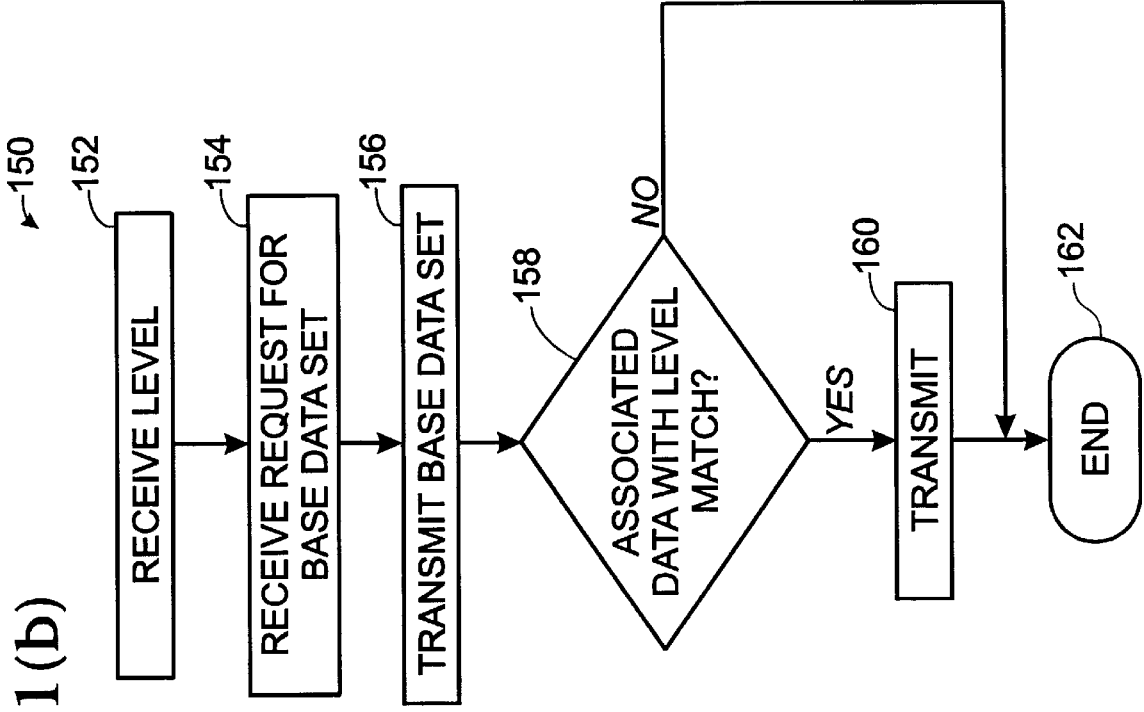
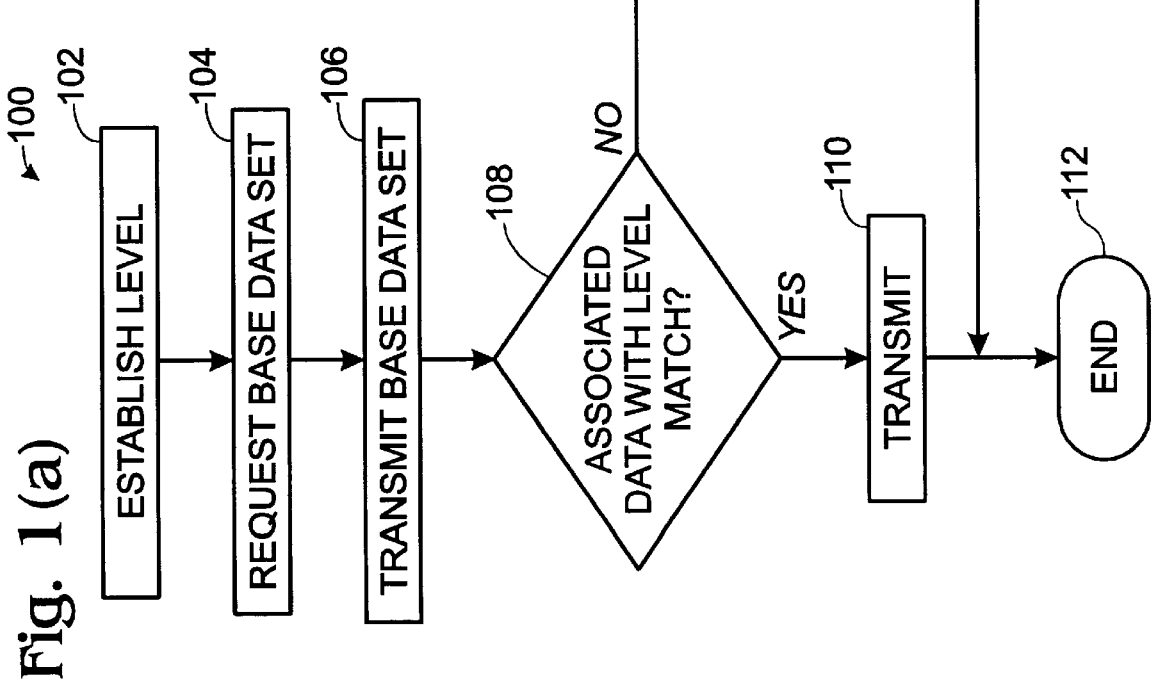
Fig. 1(a)
Fig. 1(b)

MULTI-LEVEL CAPTIONING FOR ENHANCED DATA DISPLAY

BACKGROUND OF THE INVENTION

1. Field of the Invention

The invention relates to computer communications and human computer interfaces (HCI). More particularly, the invention relates to providing individualized data for presentation with a base data set.

2. Background

The use of the Internet and in particular the World Wide Web (WWW) has expanded dramatically in recent years, and usage is expected to continue to rise in the years to come.

Many individual computer users access the WWW through relatively slow modems, as opposed to the high speed links that some large organizations can afford. To enhance the web browsing experience for these users it is important to reduce the amount of information that must be transmitted and yet provide useful information.

Presently web page descriptions of embedded objects such as graphics are not individualized. A web browsing experience would be enhanced by the delivery of specialized data that is associated with a particular data object or web page.

What is needed is a method for establishing a user's preference for the type of data delivered during a browsing session, and directing a web server to only deliver the appropriate data blocks associated with a base data set.

SUMMARY OF THE INVENTION

The present invention provides for enhancing the presentation of data received by a client computer from a server computer.

Briefly, blocks of data that are characterized by varying levels of complexity or appropriateness for particular audiences, and that are associated with a base data set, are selected for transmission to a client requesting the base data set, for subsequent presentation to a user along with presentation of the base data set. Selection of an associated data block is based on a specific level established by the client and communicated to the server.

In various aspects of the present invention options are provided for the client to establish levels by such means as login IDs, express selection, usage profiling, visual imaging, and similar methods.

In further aspects of the present invention, alternative embodiments provide for specification of a range of levels, or specification of a rule set for taking action when associated data blocks are present but do not match the level specification.

BRIEF DESCRIPTION OF THE DRAWINGS

FIG. 1(a) is a flowchart illustrating processing and communication between a server and a client in an embodiment of the present invention.

FIG. 1(b) is a flowchart illustrating a server process in accordance with the present invention.

DETAILED DESCRIPTION

Overview

Figure 1C:
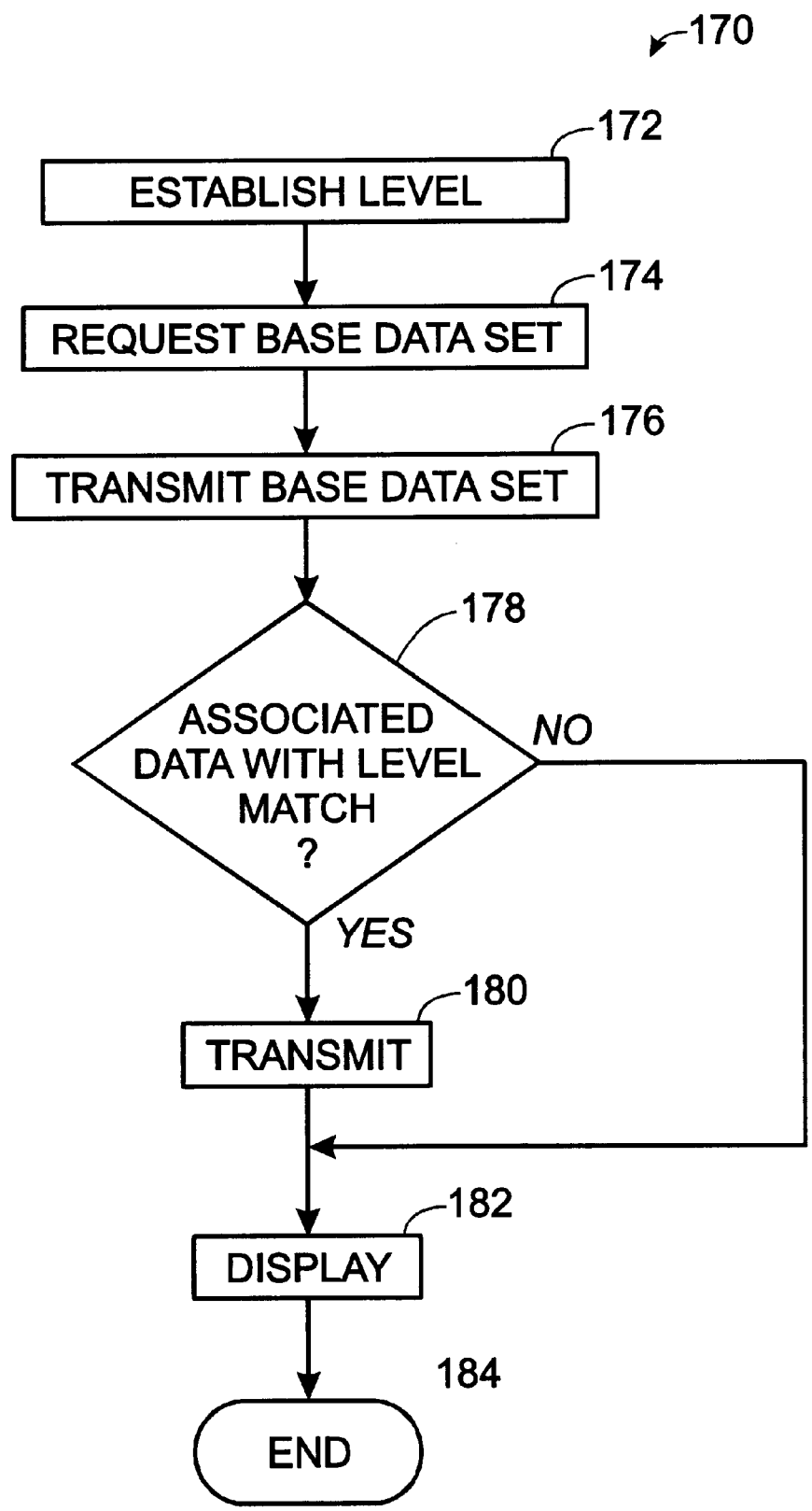
FIG. 1(c) is a flowchart illustrating processing and communication between a server and a client in an embodiment of the present invention.

The present invention enables a web server to provide at least one of several different blocks of data associated with a given base data set. Typically, this takes the form of providing one of several different blocks of text associated with a given graphic object on a web page. These data blocks may be used to provide captions for the base data set, or may be extensive documentation related to the base data set.

A plurality of data blocks are associated with a base data set. Each of the associated data blocks is adapted for a particular audience. A profiling mechanism resident on a local PC recognizes the user's requirements or preferences. For, example, an adult and a child might receive different text associated with a graphic object. A content provider produces these different text blocks.

Association of data blocks with a base data set is a well understood process by those skilled in the art. For example, basic computer science techniques such as pointers or index tables can be used to associate data blocks with other objects, such as the base data sets referred to herein. Although associated data blocks will typically be stored on servers that are remote from the client, it is also possible to have both client and server processes running on the same physical computer in one location.

Generally, a level acceptable to the user is established either at the beginning of a browsing session, or is established as a default preference and used for all sessions unless specifically changed by a user. The ability to communicate information between a browser session on a client (e.g., a PC) and a remote web server exists presently in popular, commercially available web browsers.

There are a number of ways in which a level or range of levels can be established. In one method to establish a level for a browsing session, there may be a level selected as a default preference by the user or a system administrator for particular login IDs (also referred to as user IDs).

Another method to establish a level, or a range of levels, is to expressly specify them. In this case, users are prompted to specify their preferences. Alternatively, there is no prompting, but the user may access a menu through which their preferences for levels may be specified.

A level may also be established by profiling usage patterns. For example, by using known software techniques for monitoring and recording which applications are run and which web sites are visited, embodiments of the invention can use this information to determine, with reasonable likelihood of success, whether the user is an adult or a child (or a gardening versus basketball enthusiast, and so on).

A further method for establishing a level requires that a user be identified, and once identified a default preference can be associated with that user from a predetermined table of default preferences. For example, during the initial setup of a computer system in accordance with the invention, the user engages in a dialog with the computer and enters a level or range of levels to be associated with the user's visual image. That is, using a video camera or digital still camera, the user enters a digitized image of herself or himself. Thereafter, when launching a browsing session the user is imaged by the computer system (typically a PC with video camera attached) and the image data is used to identify the user and thus point to the user's level preferences.

Those skilled in the art will recognize that variations of when and how to establish a level, how to propagate it, and when and whether to prompt a user for additional input are possible.

On the server side, the associated data blocks are tagged with a field that corresponds to a level or range of levels. For example, when the subject matter domain of the browsing session is motion pictures, then levels and tag fields might correspond to the movie rating system of General Audience, Parental Guidance, Restricted, and so on. Similarly, levels and tag fields can correspond to age ranges. A further example is a web site hosted by a zoo which serves both the scientific community and children's educational needs. In this example, a high resolution image of an animal is transmitted to both an adult and child visitor to the web site, however the adult's level specification indicates to the server that scientific journal information should additionally be transmitted, whereas the child's level specification indicates that an age appropriate description should be transmitted. Embodiments of the present invention are not limited to any specific format for, or meaning attributed to, the level and tag fields. The user established level, or range of levels, directs the server to select the associated data that is most appropriate for the intended recipient. Generally, only a few bytes of information are needed to specify levels and tag fields.

Terminology

Browser refers to a program which allows a user to read hypertext. The browser gives some means of viewing the contents of nodes and of navigating from one node to another. Browsers act as clients to remote web servers. Netscape Navigator (Netscape Communications Corp., www.netscape.com) and Internet Explorer (Microsoft Corporation, www.microsoft.com) are examples of browsers for the World wide Web.

Closed captioning, as used herein, refers to providing and optionally communicating information in one medium, where that information is associated with information being communicated in at least one other medium. Typically, closed captioning takes the form of text associated with a non-textual communication. For example, text associated with a graphic or video clip.

Data block, and data set, as used herein, each refer to collection of information that can be perceived by humans, typically with the aid of a device such as a personal computer. The data blocks and data sets may be representative of text, graphics, audio, video or similar formats.

HTML (also html) refers to a hypertext document format used on the World wide Web. "Tags" are embedded in the text. A tag consists of a "<", a "directive", zero or more parameters and a ">". Matched pairs of directives, like "<title>" and "</title>" are used to delimit text which is to appear in a special place or style.

HTTP (also http) refers to the client-server TCP/IP protocol used on the World Wide Web for the exchange of HTML documents.

Level, as used herein, refers to a grading or rating that indicates the particular audience for which a block of associated data is targeted. Alternatively, the level may be viewed as a set of filter parameters that, in conjunction with a programmable filter, control whether a particular block of associated data will be transmitted to a particular user.

Proxy gateway refers to a computer and associated software that will pass on a request for a URL from a World Wide Web browser to an outside server and return the results. This provides a trusted agent that can access the Internet on behalf of clients that are sealed off from the Internet. The client's user is typically not be aware of the proxy gateway.

Proxy server refers to a World Wide Web server that accepts URLs with a special prefix. When it receives a request for such a URL, it strips off the prefix and looks for the resulting URL in its local cache. If found, it returns the document immediately, otherwise it fetches it from the remote server, saves a copy in the cache and returns it to the requester. The cache will usually have an expiry algorithm that flushes documents according to their age, size, and access history.

Rule set, as used herein, refers to a collection of instructions that directs a computer to take specified actions under certain conditions. For example, a rule could direct a web server to deliver an index of all data blocks associated with a particular base data set, under the condition that none of the associated data blocks matched the user specified level. Typically the rule set is supplied to the server by the client, and the rule set typically is executed on the web server. It is possible to have a rule set that is executed by the client. A client executed rule could, for example, direct a client computer to block access to a web site where none of the associated data blocks are within a specified range of levels.

URL (Uniform Resource Locator) refers to a draft standard for specifying an object on the Internet, such as a file or newsgroup. URLs are used extensively on the World wide Web. They are used in HTML documents to specify the target of a hyperlink. Background information on URLs may be obtained from "http://www.w3.org/pub/WWW/Addressing/Addressing.html".

Video stream refers to a one or more signals that represent, and from which can be reconstructed, an image of an object. Typically, these signals are in either analog or digital format. However, any signal format that is suitable for communicating a reconstructable representation of an image is contemplated to be encompassed by the expression "video stream". Video stream as used herein contemplates any image data stream produced by sensing devices, including but not limited to visible light video cameras, scanners, digital still cameras, infrared sensors, magnetic resonance imaging (MRI) sensors and the like.

Web server refers to a server process running at a web site that sends out web pages in response to HTTP requests from remote browsers.

Web site refers to any computer on the Internet running a World Wide Web server process. A particular web site is identified by the hostname part of a URL.

World Wide Web refers to an Internet client-server hypertext distributed information retrieval system that originated from the CERN High-Energy Physics laboratories in Geneva, Switzerland. The client program is known as a browser and runs on the user's computer. Documents on the world wide web are represented to the user as hypertext objects in HTML format. Hypertext links refer to other documents by their URLs. These can refer to local or remote resources accessible through FTP, Gopher, Telnet or news, as well as those available by way of the http protocol used to transfer hypertext documents. The World Wide Web is alternatively referred to as WWW, W3, or the Web.

Some portions of the detailed descriptions that follow are presented in terms of algorithms and symbolic representations of operations on data bits within a computer system. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is to be appreciated that throughout the description of embodiments of the present invention, discussions utilizing terms such as "processing" or "computing" or "calculating" or "determining" or "displaying" or the like, refer to the action and processes of a computer system, or similar computing device, that manipulates and transforms data represented as physical (e.g., electronic) quantities within a computer system's registers and memories into other data similarly represented as physical quantities within the computer system memories or registers or other such information storage, transmission or display devices.

General Process with single level

Referring to FIG. 1(a), a process 100 embodying the present invention is described. In a step 102 a level for the associated data is established. Typically, at the beginning of a session, the level is communicated by the client to the server. Those skilled in the art will recognize that the level may be communicated between the client and server more or less frequently than the beginning of a session. In a step 104 the client requests a base data set, and, in a step 106 the base data set is transmitted to the client.

In a step 108 a determination is made as to whether an associated data set with a matching level is present on the server. If an associated data set with a matching level is not present, then in a step 112 the process ends. However, if an associated data set with a matching level is present, then in a step 110 it is transmitted to the client that requested the base data set. Subsequently, in a step 112 the process ends.

FIG. 1(c) illustrates an embodiment of the present invention similar to that shown in FIG. 1(b). The embodiment illustrated in FIG. 1(c) includes a step 182 in which the data received, by the user from the server, is displayed. In this context, the step of displaying is meant to include any form of communication with the user. Typically the step of displaying is accomplished by visually transmitting information to a user through a computer monitor. However, audio, mechanical, or any other suitable means of communicating information may be used.

Server-Side Process with single level

FIG. 1(b) illustrates a process 150 in accordance with the present invention as embodied in a server. In a step 152 a web server receives a user preference level. In a step 154 the server receives a request, from a user, for a base data set. Subsequently, in a step 156 the base data set is transmitted to the user. In a step 158 a determination is made as to whether an associated data set with a matching level is present on the server. If an associated data set with a matching level is not present, then in a step 162 the process ends. However, if an associated data set with a matching level is present, then in a step 160 it is transmitted to the user. Subsequently, in a step 112 the process ends.

General Process with range of levels

Figure 2A:
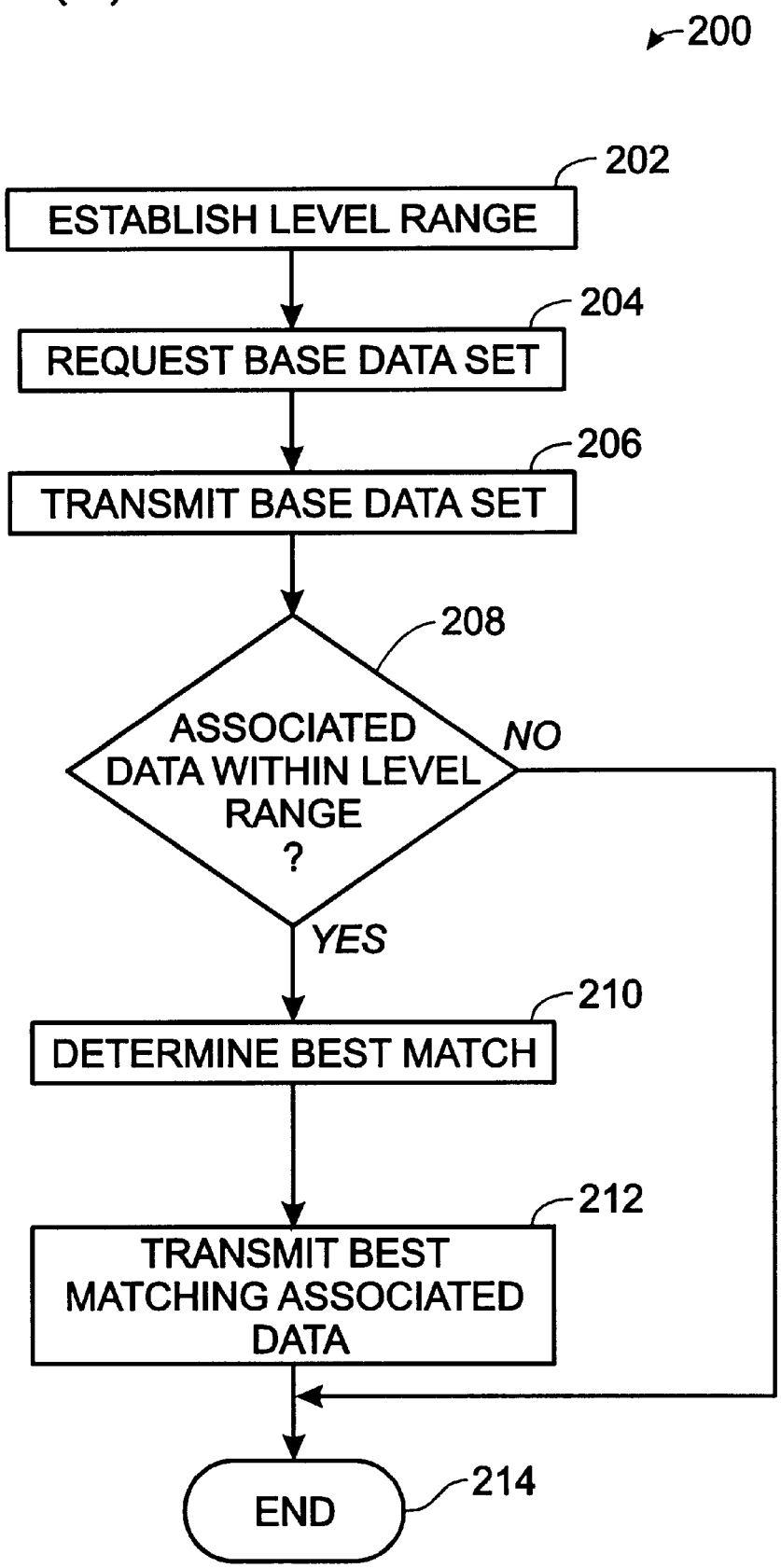
FIG. 2(a) is a flowchart illustrating processing and communication between a server and a client in an embodiment of the present invention

Referring to FIG. 2(a), a process 200 embodying the present invention is described. In a step 202 a range of levels is established. This range of levels will be used by the server to determine whether a particular block of associated data has the appropriate attributes for transmission to the user.

In a step 204 the user requests a base data set and in a step 206 transmits the base data set to the user. In a step 208 a determination is made as to whether an associated data set, that matches within the range of levels specified by the user, exists on the server. If an associated data set with a matching level is not present, then in a step 214 the process ends. However, if an associated data set with a matching level is present, then in a step 210 the best matching data set within the range of values is selected and in a step 212 it is transmitted to the user. Subsequently, in a step 214 the process ends.

Server-Side Process with range of levels

Figure 2B:
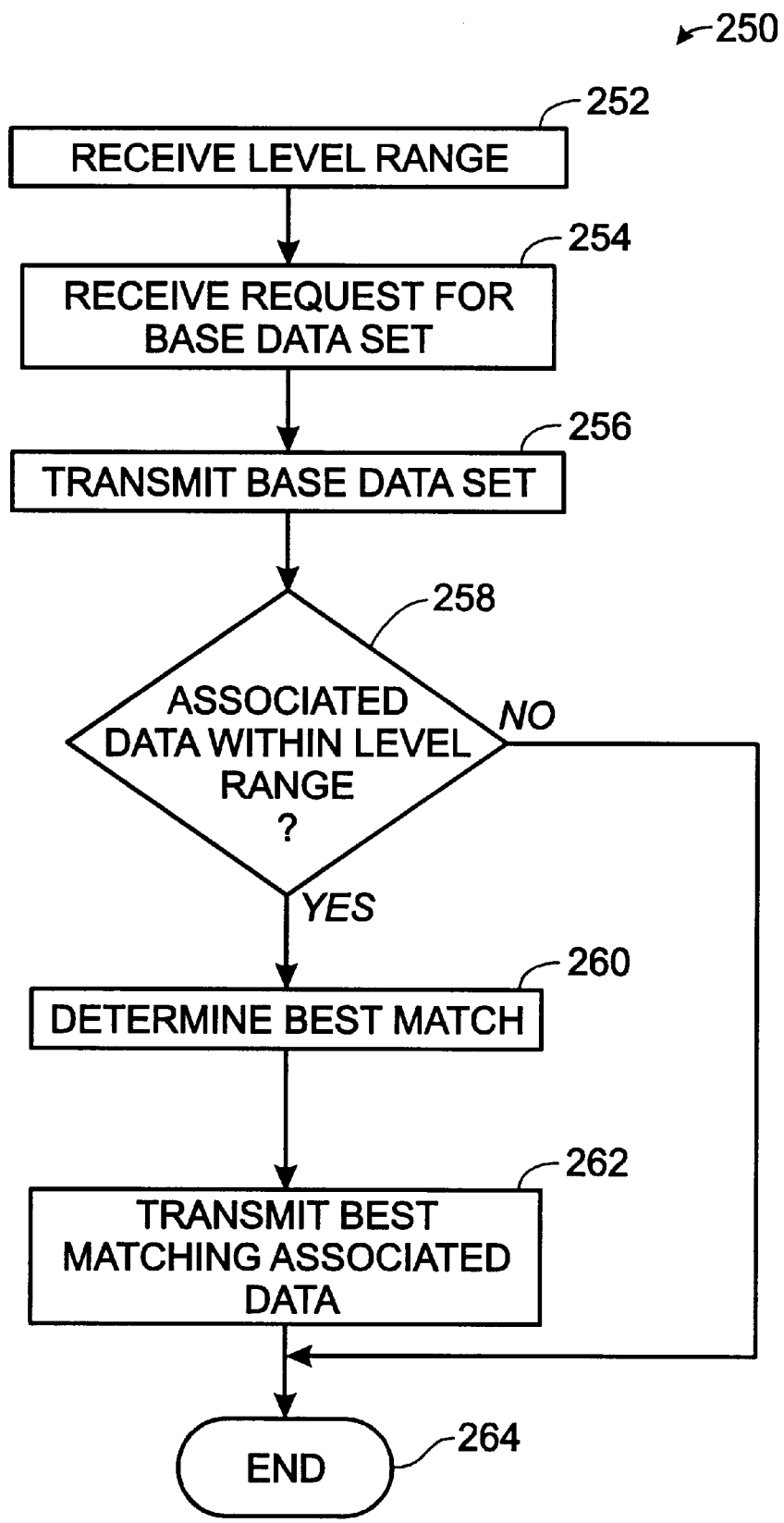
FIG. 2(b) is a flowchart illustrating a server process in accordance with the present invention.

FIG. 2(b) illustrates a process 250 in accordance with the present invention, as embodied in a server. In a step 252 a web server receives a range of user preference levels. In a step 254 the server receives a request, from a user, for a base data set. Subsequently, in a step 256 the base data set is transmitted to the user. In a step 258 a determination is made as to whether an associated data set, that matches within the range of levels specified by the user, exists on the server. If an associated data set within the range of levels is not present, then in a step 264 the process ends. However, if an associated data set within the range of levels is present, then in a step 260 the best, i.e., closest, matching associated data set is selected, and in a step 262 that associated data set is transmitted to the user. Subsequently, in a step 264 the process ends.

General Process with rule set

Figure 3A:
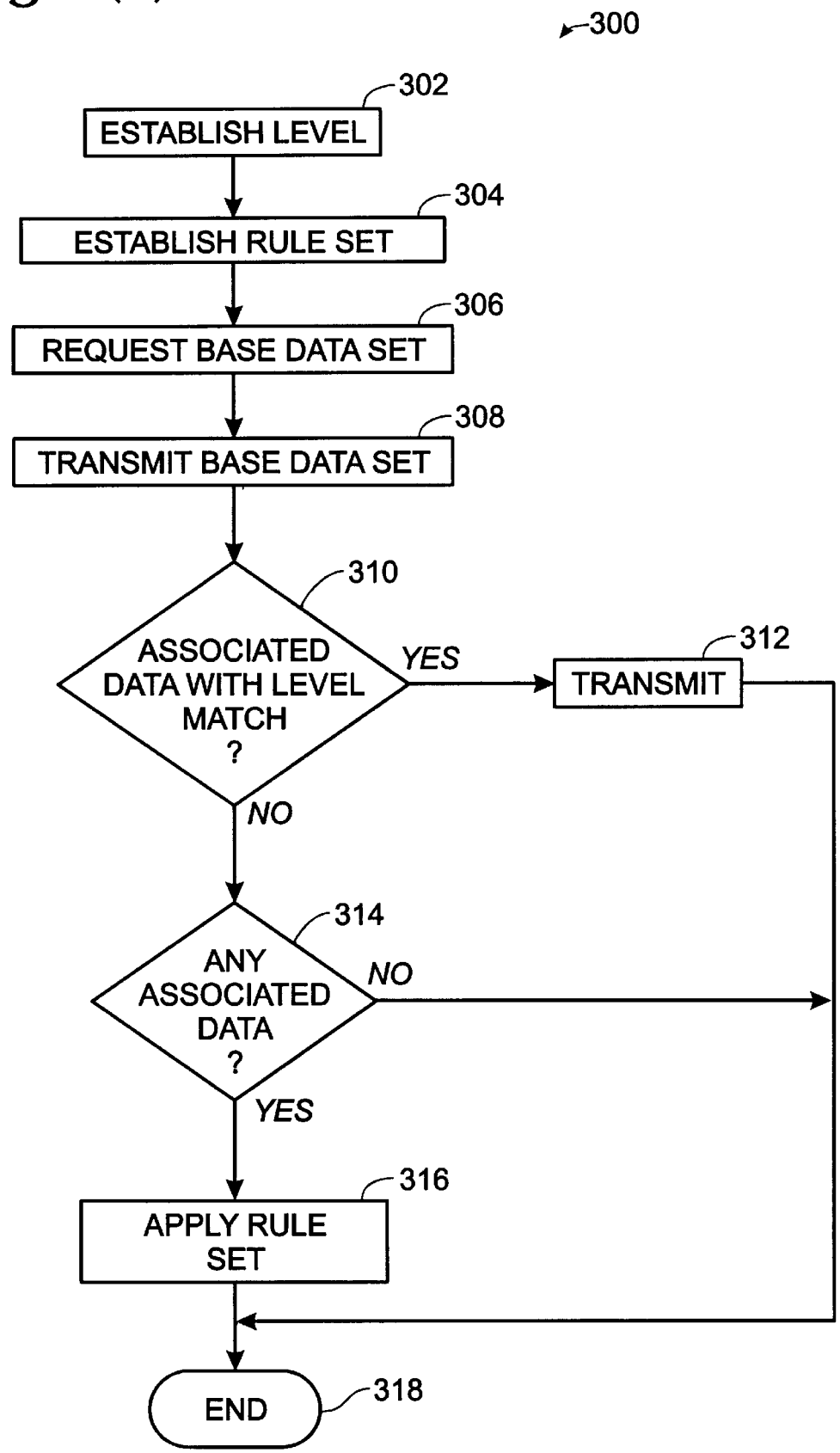
FIG. 3(a) is a flowchart illustrating processing and communication between a server and a client in an embodiment of the present invention

Referring to FIG. 3(a), a process 300 embodying the present invention is described. In a step 302 a level for the associated data is established. In a step 304 a rule set is established. A base data set is requested by a user in a step 306 and the base data set is transmitted to the requestor in a step 308. In a step 310 a determination is made as to whether there is any associated data having a matching level. If the determination in step 310 is affirmative then in a step 312 the associated data is transmitted to the user and the process ends in a step 318.

However, if the determination is step 310 is negative, then in a step 314, a determination is made as to whether there is any data associated with the base data set. If there is no associated data, then the process ends in a step 318. On the other hand, if the determination is made that associated data, albeit of a non-matching level, exists, then in a step 316 the rule set is applied. Subsequently, the process ends in a step 318.

Server-Side Process with rule set

Figure 3B:
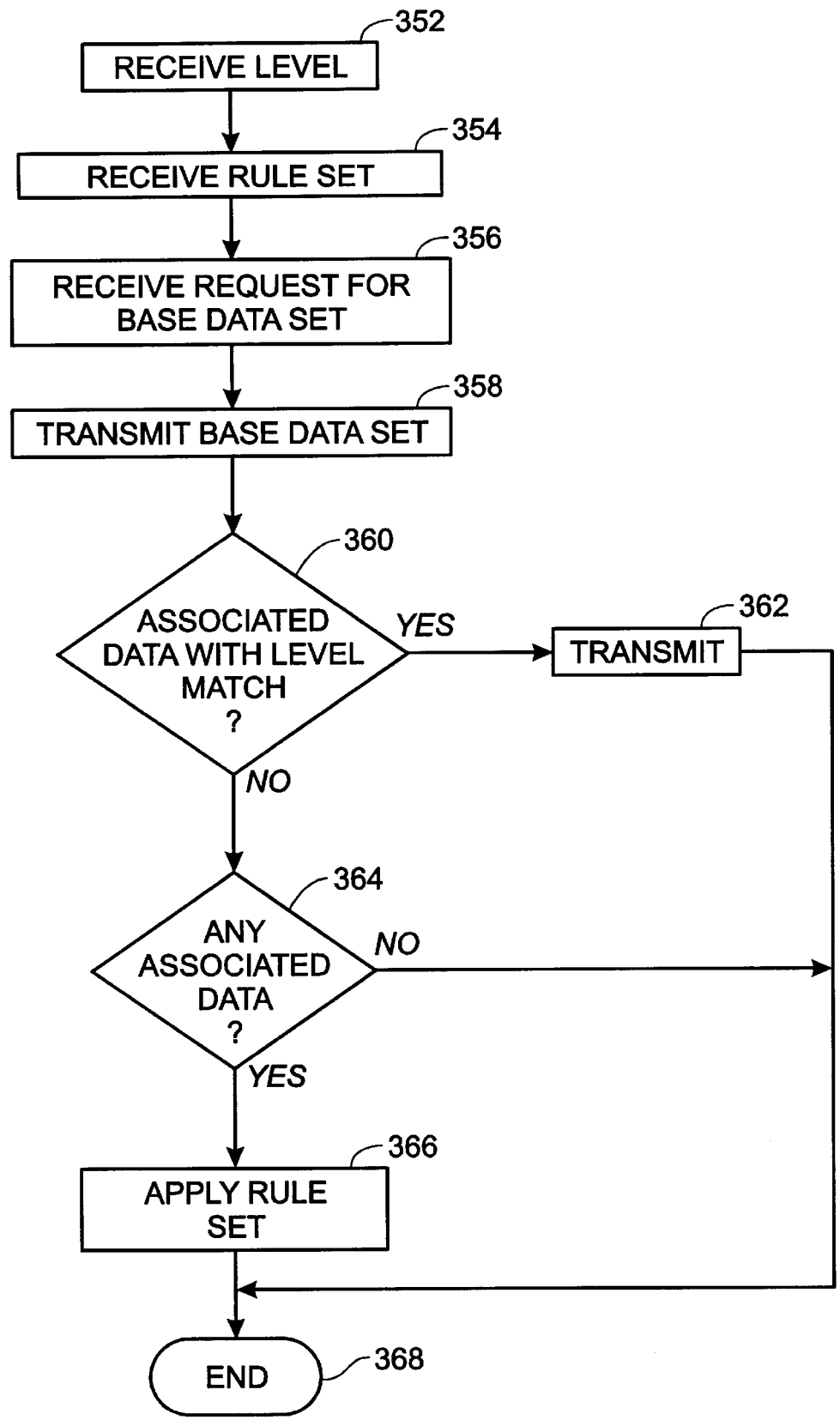
FIG. 3(b) is a flowchart illustrating a server process in accordance with the present invention.

FIG. 3(b) illustrates a process 350 in accordance with the present invention, as embodied in a server. In a step 352 the server receives a level for the associated data. In a step 354 the server receives a rule set from the user. A request for a base data set is received by the server in a step 356 and the base data set is transmitted to the requestor in a step 358. In a step 360 a determination is made as to whether there is any associated data having a matching level. If the determination in step 360 is affirmative then in a step 362 the associated data is transmitted to the user and the process ends in a step 368.

However, if the determination is step 360 is negative, then in a step 364, a determination is made as to whether there is any data associated with the base data set. If there is no associated data, then the process ends in a step 368. On the other hand, if the determination is made that associated data, albeit of a non-matching level, exists, then in a step 366 the rule set is applied. Subsequently, the process ends in a step 368.

Conclusion

The present invention provides a method for enhancing the presentation of data received by a client computer from a server computer without consuming unneeded bandwidth.

An advantage of the present invention is that users' preferences can be transparently determined and communicated to a web server to facilitate individualization of the content provided during the browsing session.

A further advantage of the present invention is that the web browsing experience is improved by overcoming communication bandwidth limitations through the use of computational resources available in servers and PCs.

It will be understood by those skilled in the art that many design choices are possible within the scope of the present invention. For example, the user level may be updated more or less frequently than described in the illustrative embodiments. Additionally, the present invention is not limited to communication via the World Wide Web, rather it is applicable to many client-server arrangements and communication protocols in which the server provides individualized information.

The present invention can be embodied as methods and apparatuses for practicing those methods. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The program code encoded in tangible media creates the means for causing the computer to perform the various steps of the present invention. The present invention can also be embodied in the form of computer program code, whether stored in a storage medium loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general purpose microprocessor, the computer program code combines with the microprocessor to provide a unique device that operates analogously to specific circuits.

It will be understood that various other changes in the details, materials, and arrangements of the parts and steps which have been described and illustrated may be made by those skilled in the art without departing from the principles and scope of the invention as expressed in the subjoined claims.

What is claimed is:

1. A method of communicating information to a user, the method comprising the steps of:
   a) establishing a user level;
   b) requesting a base data set;
   c) transmitting the base data set;
   d) determining if an associated data block that matches the user level is present; and
   e) if the determination in step (d) is affirmative, transmitting the associated data block that matches the user level.

2. The method of claim 1, wherein the step of establishing a user level comprises:

associating a level with the user's login ID.

3. The method of claim 1, wherein the step of establishing a user level comprises:

expressly setting a level.

4. The method of claim 1, wherein the step of establishing a user level comprises:

expressly setting a range of levels.

5. The method of claim 1, wherein the step of establishing a user level comprises:

profiling the usage patterns of the user; and mapping the usage patterns to at least one level.

6. The method of claim 1, wherein the step of establishing a user level comprises:

visually imaging the user to create a video stream;

identifying the user based on the video stream; and selecting at least one level based on a predetermined profile of the identified user.

7. The method of claim 1, further comprising the steps of:

presenting the associated data to the user at substantially the same time that the base data set is presented to the user.

8. The method of claim 7, wherein the associated data is a type of data selected from the group consisting of text, audio, video and graphics.

9. The method of claim 7, wherein the base data set is a type of data selected from the group consisting of text, audio, video and graphics.

10. A method of communicating information to a user, the method comprising the steps of:
    a) receiving a user level;
    b) receiving a request for a base data set;
    c) transmitting the base data set;
    d) determining if an associated data block that matches the user level is present; and
    e) if the determination in step (d) is affirmative, transmitting the associated data block that matches the user level.

11. A method of communicating information to a user, the method comprising the steps of:
    a) receiving a user level;
    b) receiving a rule set;
    c) receiving a request for a base data set;
    d) transmitting the base data set;
    e) determining if an associated data block that matches the user level is present; and
    f) if the determination in step (e) is affirmative, transmitting the associated data block that matches the user level;
    g) if the determination in step (e) is negative, determining if there are any data blocks associated with the base data set; and
    h) if the determination in step (g) is positive, executing the rule set.

12. The method of claim 11, wherein the rule set directs transmission of an index of the associated data blocks.

13. A computer readable storage medium encoded with computer readable program code, comprising:
    a) a program code for causing the computer to receive a user level;
    b) a program code for causing the computer to receive a request for a base data set;
    c) a program code for causing the computer to transmit the base data set;

d) a program code for causing the computer to determine if an associated data block that matches the user level is present; and e) a program code for causing the computer to transmit the associated data block that matches the user level if the determination in step (d) is affirmative.

14. A computer readable storage medium encoded with computer readable program code, comprising:

a) a program code for causing the computer to receive a user level;

b) a program code for causing the computer to receive a rule set;

c) a program code for causing the computer to receive a request for a base data set;

d) a program code for causing the computer to transmit the base data set;

e) a program code for causing the computer to determine if an associated data block that matches the user level is present;

f) a program code for causing the computer to transmit the associated data block that matches the user level if the determination in step (e) is affirmative;

g) a program code for causing the computer to determine if there are any data blocks associated with the base data set, if the determination in step (e) is negative; and h) a program code for causing the computer to execute the rule set if the determination in step (g) is positive.

* * * * *